(12) United States Patent
Pereira

(10) Patent No.: US 6,915,374 B2
(45) Date of Patent: Jul. 5, 2005

(54) METHOD AND SYSTEM FOR SETTING OPTICAL DRIVE WRITE STRATEGIES

(75) Inventor: David M. Pereira, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 10/370,145

(22) Filed: Feb. 19, 2003

(65) Prior Publication Data

US 2004/0162938 A1 Aug. 19, 2004

(51) Int. Cl.[7] .............................................. G08F 12/00
(52) U.S. Cl. ...................... 711/5; 250/492.1; 369/47.53
(58) Field of Search ................... 711/5, 111; 369/47.53, 369/59.12, 116, 275.2; 250/492.1–492

(56) References Cited

U.S. PATENT DOCUMENTS

| | | | |
|---|---|---|---|
| 6,154,437 A | 11/2000 | Utsunomiya et al. .... | 369/275.2 |
| 6,407,976 B2 | 6/2002 | Nagara et al. .............. | 369/116 |
| 6,445,669 B1 | 9/2002 | Hattori et al. .............. | 369/116 |
| 6,469,968 B1 | 10/2002 | Van Den Enden et al. ...... | 369/59.12 |
| 6,835,943 B2 * | 12/2004 | De Jager et al. .......... | 250/492.3 |
| 6,842,413 B2 * | 1/2005 | Miyaki .................... | 369/47.53 |

* cited by examiner

Primary Examiner—Nasser Moazzami
(74) Attorney, Agent, or Firm—Hamilton & Terrile, LLP; Robert W. Holland

(57) ABSTRACT

An optical drive writes information to an optical medium by obtaining a write strategy for the optical medium from a source external to the optical drive. A write module in the optical drive reads an optical medium identification code from the optical medium and determines that the write strategy for the optical medium is unavailable from an optical drive write strategy table. The write module communicates a request for a write strategy associated with the optical medium identification code read from the optical medium to a host information handling system which obtains the requested write strategy for the optical drive from a host write strategy table or a network location. Periodic updates from the network to the host information handling system and from the host information handling system to optical drive firmware aid in maintaining the optical drive's write strategy list up to date.

20 Claims, 2 Drawing Sheets

METHOD AND SYSTEM FOR SETTING OPTICAL DRIVE WRITE STRATEGIES

BACKGROUND OF THE INVENTION

1. Field of the Invention

The present invention relates in general to the field of writing information to optical media, and more particularly to a method and system for setting optical drive write strategies for writing information to optical media.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An increasingly popular media for storing information is writable and re-writable optical media, such as CD and DVD disks. Greater consumer demand for writable optical media has led to a greater number of manufacturers of writable optical media and an effort by these manufacturers to improve optical media write speeds by developing new variations in dye formulation and manufacturing parameters. Optical drives store information on these optical media by illuminating an optical medium disk with a focused laser beam that alters the reflective properties of the medium. The information is read from the optical medium by illumination of the medium with a lower powered laser and by measuring the reflectivity of the optical medium. Optical drive manufacturers attempt to store information on optical media to meet standards that require write attempts to be reasonably free from errors. In order to have reasonable writing accuracy, optical drive manufacturers often develop separate write strategies for each type of optical medium. A write strategy is a combination of write parameters, such as write laser power, pulse shape, pulse width, etc . . . , that permit the optical drive to write to a disk with an acceptable number of errors. Typically, optical drives identify an inserted disk by type and manufacturer from an identification code embedded on the disk by the manufacturer. The optical drive then selects a write strategy for the disk from a stored list of write strategies and applies the selected write strategy to write the information onto the disk.

One difficulty faced by optical drive manufacturers is maintaining the list of write strategies on an optical drive so that optical media developed after the optical drive is in use can have a write strategy added to the list. Write strategies are typically bundled in drive firmware unseparated from executable code. One solution is for information handling system manufacturers to update optical drive firmware with a current write strategy list immediately before shipping the information handling system to a customer. However, updating a write strategy list generally involves a costly and time consuming re-flash of firmware since changes to executable code must generally be confirmed before shipment, and updating a list at shipment does not address write strategies developed after shipment of the information handling system. Another solution used by optical drive manufacturers is to have a non-optimized generic write strategy available for optical medium disks having an identification code not included in the optical drive write strategy list. However, a generic write strategy typically results in reduced write quality and write speed. Another solution is to post drive firmware with an updated list of write strategies for download to the optical drive, such as at an Internet site, although users generally must know of and access such downloadable firmware and such updates generally require a re-flash of firmware.

SUMMARY OF THE INVENTION

Therefore a need has arisen for a method and system which automatically updates an optical drive write strategy list for writing information to an optical medium absent from the write strategy list.

A further need exists for a method and system which supports write strategies not found in optical drive firmware and updates an optical drive's write strategy list in the drive's non-volatile memory without changing the firmware itself to minimize interference in information handling system use.

In accordance with the present invention, a method and system are provided which substantially reduce the disadvantages and problems associated with previous methods and systems for writing information to optical media. An optical drive writes information to an optical medium for which the optical drive lacks a write strategy by obtaining the write strategy from a source external to the optical write drive.

More specifically, a write module in the optical drive reads an optical medium identification code from an inserted optical medium and uses a write strategy associated with the optical medium identification code to write information to the optical medium. The write module searches an internal optical drive write strategy list for the optical medium identification code to locate the optical medium's write strategy. If the optical medium identification code is not listed in the optical drive write table, the write module communicates the identification code through a command interface to a host information handling system write application or utility which searches a host write strategy table for a write strategy associated with the optical medium identification code. If the host information handling system lacks the requested write strategy, a network site is contacted to download the requested write strategy from a network server write strategy list. The write strategy is returned to the write module for use in writing the information to the optical medium. The write module may continue to access the information handling system write strategy table for writing to optical media having the same identification code, or may store the write strategy in its internal write strategy list. In one embodiment, an optical drive write strategy table is periodically updated from the host write strategy table to reduce delays in use of the information handling system during non-volatile memory reprogramming.

The present invention provides a number of important technical advantages. One example of an important technical advantage is that an optical drive automatically updates from an external source its write strategy list for writing information to an optical medium if a write strategy for an optical medium in the optical drive is absent from the optical drive's internal write strategy list. An optical medium identification is used to obtain the updated write strategy from a host information handling system write strategy list or through a network from a server that lists available write strategies. The availability of a write strategies from an external source reduces the frequency of the use of generic write strategies and thus improves write quality and speed for the optical drive.

Another example of an important technical advantage of the present invention is that an optical drive supports write strategies not found in optical drive firmware and updates its internal write strategy list in its non-volatile memory with minimal interference in information handling system use by maintaining a write strategy list separate from executable firmware. Write strategies are stored in a host information handling system write strategy list and made available for use by the optical drive without delays related to reprogramming of flash memory. Updated write strategies are periodically loaded to optical drive non-volatile memory to update the internal write strategy list when the interference to use of the information handling system by reprogramming is reduced, for instance during non-use of the optical drive. Further, the information handling system periodically accesses updated write strategy lists through the Internet to maintain a current list of write strategies.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An optical drive writes information to an optical medium type, such as type categorized by manufacturer, for which the optical drive lacks a write strategy by obtaining the write strategy from a source external to the optical drive, such as an information handling system host interfaced with the optical drive or an information handling system server communicating with the optical drive through a network. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
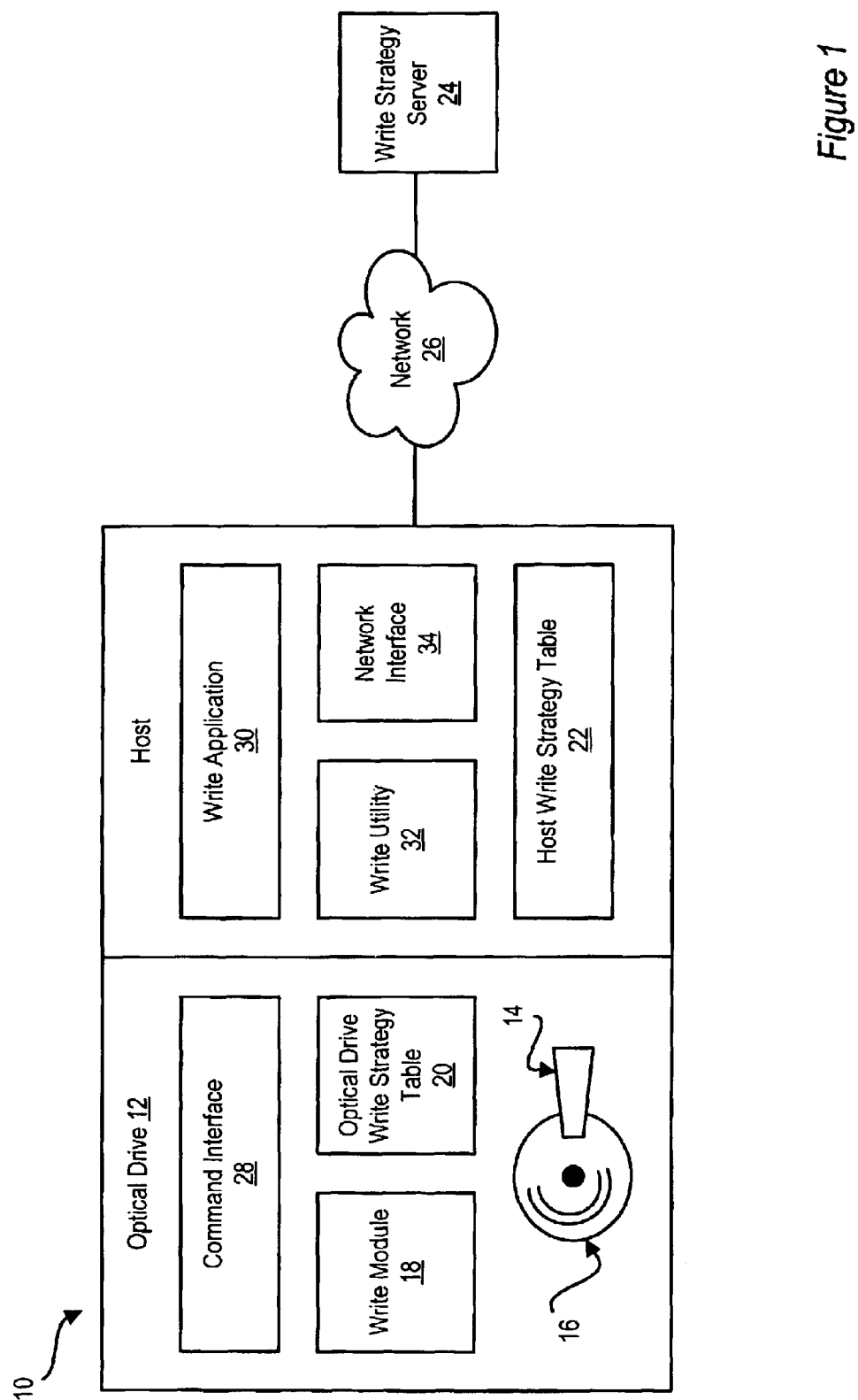
FIG. 1 depicts a block diagram of a system for setting optical drive write strategies.

Referring now to FIG. 1, a block diagram depicts a system for setting optical drive write strategies for writing to an optical medium type having an identification not recognized by the optical drive. A host information handling system 10 interfaces with and supports the operation of an optical drive 12 having a laser operable to read information from and write information to an optical medium disk 16, such as a CD-R, CD-RW, DVD-R, DVD+RW or DVD-RAM disk. Host information handling system 10 generates information to write to optical medium disk 16 by running applications with components such as the CPU. Optical medium disk 16 has an identification code or other identification indicia stored by its manufacturer, typically embedded in a non-user accessible area. The optical medium identification code uniquely identifies the optical medium type by manufacturer and formulation and is associated by drive manufacturers with a write strategy for writing information to disks of the optical medium type. For instance, the write strategy defines the pulse power, shape, width and other parameters used by laser 14 to write information to optical medium disk 16. When an optical medium disk 16 is inserted in optical drive 12, a write module 18 identifies the particular type of disk 16 by reading the embedded identification code or other identification indicia and obtains the write strategy for the optical medium disk by looking up the identification code in an optical drive write strategy table 20. Optical drive write strategy table 20 stores in optical drive non-volatile memory plural write strategies for different types of optical media cross referenced by the optical medium identification code or other identification indicia.

If write module 18 fails to locate an optical medium identification code in optical drive write strategy table 20, then write module 18 attempts to locate a write strategy associated with the optical medium identification code from a source external to optical drive 12, such as a host write strategy table 22 or from a write strategy server 24 by communicating through a network 26. For instance, write module 18 communicates through a command interface 28 to host information handling system 10 to request a write strategy for the optical medium identification code read from optical medium disk 16. If a write strategy is returned through command interface 28 in response to the request, then write module 18 applies the write strategy to write information to optical medium disk 16 and updates optical drive write strategy table 20 with the write strategy referenced by the optical medium identification code so that subsequent writes to optical medium disks having that identification code are handled internally within optical drive 12. In one embodiment, write strategies are associated with a date in the drive and/or host write strategy tables so that write strategies of a predetermined age may be checked to determine whether a more current write strategy is available.

In one embodiment, command interface 28 coordinates the request for a write strategy with the write application 30 that has requested to write information to optical medium disk 16. Write application 30 queries a host write strategy table 22 for the optical medium identification code read from optical medium disk 16 by write module 18. If the host write strategy table 22 has a write strategy listed for the optical medium identification code, then write application 30 provides the write strategy to write module 18 for writing the information to optical medium disk 16. The write strategy is provided to write module 18 for use in writing information to optical medium 16 without an immediate reprogramming of the optical drive firmware, for instance by instead updating optical drive write strategy table 20 in non-volatile memory. Optical drive 12 may update optical drive write strategy table 20 with a reprogramming of non-volatile memory or may continue to rely on host write strategy table 22 for obtaining the write strategy when an optical medium disk having an optical medium identification is inserted in optical drive 12. If the host write strategy table 22 lacks an entry for the optical medium identification code, write module 18 is informed that the identification code is not recognized so that a generic write strategy may be used to write the information.

In another embodiment, command interface 28 coordinates the request for a write strategy through a write utility 32, such as module incorporated in an operating system driver for optical drive 12. Write utility 32 attempts to locate a write strategy for the optical medium identification code from host write strategy table 22 in a manner similar to that described for write application 30. However, if host write strategy table 22 lacks a write strategy for the optical medium identification code, it communicates through network interface 34 and network 26 to write strategy server 24, such as the drive manufacturer's Web site, to request a write strategy associated with the optical medium identification code. Write strategy server 24 includes information to uniquely identify the optical drive so that correct write strategies for an optical medium and the identified drive are located. Further, write strategy server 24 includes authentication information to ensure that malicious code or improper write strategies are not downloaded to information handling systems. Write utility 32 also periodically initiates contact with write strategy server 24 to obtain updates to host write strategy table 22 which may then be periodically downloaded to firmware within optical drive 12 for storage on optical drive write strategy table 20 with minimal disruption to users of information handling system 10 caused by a reflash of optical drive 12's non-volatile memory.

Figure 2:
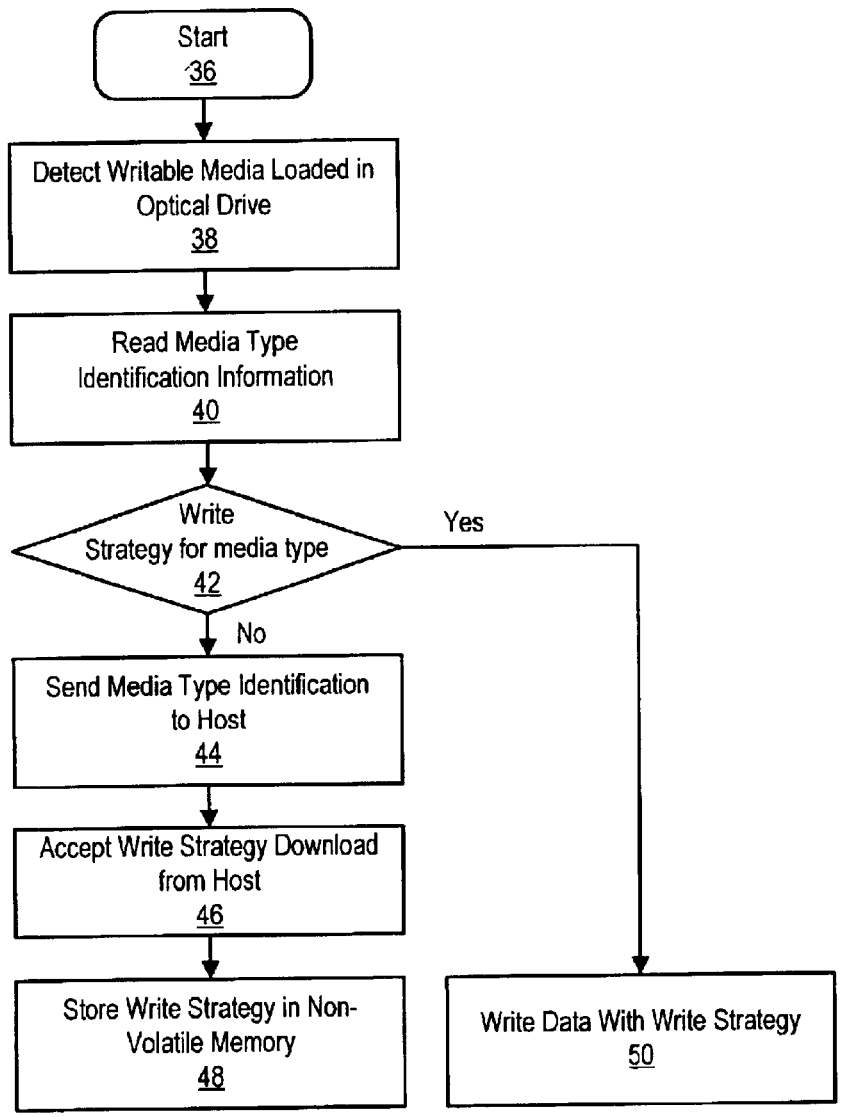
FIG. 2 depicts a process for setting optical drive write strategies.

Referring now to FIG. 2, a flow diagram depicts a process for setting optical drive write strategies to write information to an optical medium. The process begins at step 36 with insertion of an optical medium into an optical drive. At step 38, the optical drive detects that the optical medium is a writable optical medium. At step 40, the optical drive reads the optical medium type from the identification information code embedded on the optical medium by the manufacturer. At step 42, optical drive determines if a write strategy is available internally for the identified medium type. If a write strategy is available, the process continues to step 50 for a write of the information to the optical medium with the write strategy available for the identified optical medium type.

If the determination at step 42 is no, i.e., that a write strategy is not available internally for the optical medium type associated with the identification code, then the process continues to step 44 for an attempt to download an appropriate write strategy from a source external to the optical drive. At step 44, the optical media type identification code or other identification indicia and optical drive identification is sent to the host information handling system for the optical drive to find a write strategy associated with the optical medium identification code. At step 46, the optical drive accepts the write strategy from the host information handling system for writing information to the optical storage medium. At step 48, the write strategy is stored in non-volatile memory of the optical drive indexed by the associated optical medium identification code. At step 50, the information is written to the optical medium with the write strategy.

Although the present invention has been described in detail, it should be understood that various changes, substitutions and alterations can be made hereto without departing from the spirit and scope of the invention as defined by the appended claims.

What is claimed is:

1. An information handling system comprising:
   a host having plural components operable to run applications;
   a write application operable to run on the host to generate information;
   an optical drive interfaced with the host and operable to write the information to an optical medium according to a write strategy;
   a write strategy table integrated with the optical drive and having plural write strategies, each write strategy associated with an optical medium identification; and
   a write module interfaced with the write strategy table, the write module operable to read an optical medium identification from the optical medium, to select a write strategy associated with the optical medium identification from the write strategy table, to determine if the optical medium identification is missing from the write strategy table, and to obtain the write strategy for the missing optical medium identification from the host.

2. The information handling system of claim 1 further comprising a host write strategy table stored on the host and accessible by the write module to provide the write strategy associated with an optical medium identification missing from the optical drive write strategy.

3. The information handling system of claim 2 further wherein the write module communicates with the host write strategy table through the write application.

4. The information handling system of claim 2 further comprising a write utility installed on the host and operable to provide the write module with a write strategy from the host write strategy table.

5. The information handling system of claim 4 wherein the write utility is further operable to determine that an optical medium identification provided by the write module is missing from the host write strategy table and to obtain the write strategy associated with the optical medium identification from a network location external to the host.

6. The information handling system of claim 5 wherein the write utility is further operable to update the host write strategy table with the optical medium identification and associated write strategy obtained from the network location.

7. The information handling system of claim 6 wherein the write utility is further operable to periodically load the host write strategy table information to the optical drive write strategy table.

8. The information handling system of claim 1 wherein a write strategy comprises one or more of a write laser power setting, a write laser pulse shape or a write laser pulse width.

9. A method for setting an optical drive write strategy to write information to an optical medium, the method comprising:
   reading an optical medium identification from an optical medium with an optical drive;
   determining that the optical drive lacks a write strategy for the optical medium identification;

requesting a write strategy for the optical medium identification from an information handling system interfaced with the optical drive; and using the write strategy for the optical medium identification provided by the information handling system to write the information to the optical medium.

10. The method of claim 9 wherein the information handling system comprises a host for the optical drive.

11. The method of claim 9 wherein the information handling system comprises a server interfaced with the optical drive through a network.

12. The method of claim 9 further comprising:

storing the write strategy provided by the information handling system on the optical drive.

13. The method of claim 11 further comprising:

periodically downloading write strategies to the information handling system from a network server; and periodically loading the downloaded write strategies from the information handling system to the optical drive.

14. The method of claim 9 wherein a write strategy comprises one or more of a write laser power setting, a write laser pulse shape or a write laser pulse width.

15. An optical drive for writing information to an optical medium having an optical medium identification, the optical drive comprising:

a laser aligned to write information on the optical medium according to a selected one of plural write strategies;

a write strategy table storing plural write strategies by associating each of the plural write strategies with an optical medium identification; and a write module interfaced with the laser and operable to read the optical medium identification from the optical medium and to set the laser to write the information to the optical medium with a write strategy associated with the optical medium identification, the write module further operable to obtain a write strategy associated with the optical medium identification from the write strategy table or from a source external to the optical drive if the optical medium identification is not found in the write strategy table.

16. The optical drive of claim 15 wherein the source external to the optical drive comprises a host information handling system interfaced with the optical drive.

17. The optical drive of claim 15 wherein the source external to the optical drive comprises a server communicating with the optical drive through a network.

18. The optical drive of claim 15 wherein the optical medium comprises a DVD disk.

19. The optical drive of claim 15 wherein the optical medium comprises a CD-RW disk.

20. The optical drive of claim 15 wherein the optical medium comprises a CD-R disk.

* * * * *